United States Patent
Ross

(10) Patent No.: US 9,021,131 B2
(45) Date of Patent: Apr. 28, 2015

(54) IDENTIFYING LINKED MESSAGE BROKERS IN A DYNAMIC ROUTING NETWORK

(75) Inventor: Theodore L. Ross, Littleton, MA (US)

(73) Assignee: Red Hat, Inc., Raleigh, NC (US)

( * ) Notice: Subject to any disclaimer, the term of this patent is extended or adjusted under 35 U.S.C. 154(b) by 443 days.

(21) Appl. No.: 13/071,306

(22) Filed: Mar. 24, 2011

(65) Prior Publication Data

US 2012/0246340 A1    Sep. 27, 2012

(51) Int. Cl.
| | | |
|---|---|---|
| G06F 15/173 | (2006.01) | |
| H04L 12/18 | (2006.01) | |
| H04L 12/725 | (2013.01) | |
| H04L 12/721 | (2013.01) | |
| H04L 12/717 | (2013.01) | |

(52) U.S. Cl.
CPC .......... *H04L 12/1859* (2013.01); *H04L 45/308* (2013.01); *H04L 45/44* (2013.01); *H04L 45/42* (2013.01)

(58) Field of Classification Search
CPC .................... H04N 21/25891; H04N 21/4755; H04N 21/252; H04N 21/00; G06Q 30/02; G06Q 30/0269; H04L 67/306; H04L 51/10; H04L 12/5855; H04L 51/14; H04L 63/102
USPC ................................................ 709/242, 244
See application file for complete search history.

(56) References Cited

U.S. PATENT DOCUMENTS

| | | | |
|---|---|---|---|
| 6,161,006 A | 12/2000 | Balachandran | |
| 6,704,795 B1 | 3/2004 | Fernando et al. | |
| 7,181,441 B2 * | 2/2007 | Mandato et al. | ...................... 1/1 |
| 7,801,857 B2 * | 9/2010 | Betts et al. | ...................... 707/628 |
| 8,600,416 B2 * | 12/2013 | Lin et al. | ........................ 455/466 |
| 8,621,035 B2 * | 12/2013 | Li et al. | .......................... 709/217 |
| 2002/0143855 A1 | 10/2002 | Traversat et al. | |
| 2003/0115317 A1 | 6/2003 | Hickson et al. | |
| 2004/0054802 A1 | 3/2004 | Beauchamp et al. | |
| 2004/0205439 A1 | 10/2004 | Carmeli et al. | |
| 2005/0152286 A1 * | 7/2005 | Betts et al. | ...................... 370/255 |
| 2006/0168037 A1 | 7/2006 | Audu et al. | |
| 2007/0014302 A1 | 1/2007 | Vincent | |
| 2007/0083669 A1 * | 4/2007 | Tsirtsis et al. | ................ 709/238 |
| 2007/0299947 A1 | 12/2007 | El-Damhough | |
| 2008/0229334 A1 | 9/2008 | Graham et al. | |
| 2009/0125231 A1 | 5/2009 | Ichimura | |
| 2009/0240586 A1 | 9/2009 | Ramer et al. | |
| 2010/0191692 A1 | 7/2010 | Gassewitz et al. | |
| 2010/0241717 A1 * | 9/2010 | Hawkins et al. | .............. 709/206 |
| 2010/0318617 A1 | 12/2010 | Rault et al. | |
| 2011/0066690 A1 | 3/2011 | Ellanti et al. | |

(Continued)

OTHER PUBLICATIONS

Theodore L. Ross, "Systems and Methods for Providing Distributed Dynamic Routing Using a Logical Broker", U.S. Appl. No. 13/071,243, filed Mar. 24, 2011.

(Continued)

*Primary Examiner* — Duyen Doan
(74) *Attorney, Agent, or Firm* — Lowenstein Sandler LLP

(57) ABSTRACT

Systems and methods are provided that dynamically route messages based on the availability of a message consumer on any given route, and which adapt to changes in message consumer availability throughout a messaging network. In various embodiments, changes to message routing criteria at a destination broker in the network are propagated to each source broker for the destination broker, which in turn propagates the changes to their source brokers until the entire network is adapted.

20 Claims, 16 Drawing Sheets

(56) References Cited

U.S. PATENT DOCUMENTS

| | | | |
|---|---|---|---|
| 2011/0125921 A1* | 5/2011 | Karenos et al. | 709/240 |
| 2011/0145263 A1* | 6/2011 | Sakamoto et al. | 707/748 |
| 2011/0269476 A1 | 11/2011 | Kumar | |
| 2011/0302275 A1* | 12/2011 | Prodan et al. | 709/218 |
| 2012/0072548 A1 | 3/2012 | Kim | |
| 2012/0209517 A1 | 8/2012 | Li et al. | |
| 2012/0246337 A1 | 9/2012 | Ross | |
| 2013/0031186 A1 | 1/2013 | Ross | |
| 2013/0066936 A1 | 3/2013 | Krishnan et al. | |

OTHER PUBLICATIONS

Theodore L. Ross, "Systems and Methods for routing Messages Exclusively to Eligible Consumers in a Dynamic Routing Networks", U.S. Appl. No. 13/071,277, filed Mar. 24, 2011.

AMPQ 1.0 Draft Recommendation, http://www.amqp.org/confluence/pages/viewpage.action?pageId=4489238.

Theodore L. Ross, Systems and Methods for Secure Messgae Delivery to a Transient Recipient in a Dynamically Routed Network, U.S. Appl. No. 13/193,015, filed Jul. 28, 2011.

\* cited by examiner

IDENTIFYING LINKED MESSAGE BROKERS IN A DYNAMIC ROUTING NETWORK

FIELD

The present invention relates to message routing generally, and more particularly relates to dynamically routing messages according to changes in the routing network.

BACKGROUND

In conventional messaging systems, such as systems implementing queuing protocols like AMQP, the communication routes between brokers are statically defined at system setup, often based on the connections of message consumers who exist at the time that the network is first configured. Such systems typically forward all messages from message producers to all brokers in the network because a consumer for any particular message may potentially be connected to any broker in the network. The system, however, has no knowledge or tracking of whether or not a consumer for a particular message exists along any particular route.

As a consequence, conventional systems constantly forward messages to brokers that have no consumers connected to them, either directly or indirectly. This results in inefficient and unnecessary use of system resources, such as communication bandwidth between brokers, as well as processing and storage resources on each individual broker that unnecessarily handles a message for which there is no downstream consumer.

Accordingly, it is desirable to provide systems and methods that dynamically route messages based on the availability of a message consumer on any given route, and which adapt to changes in message consumer availability throughout the network.

DESCRIPTION OF DRAWINGS

The accompanying drawings, which are incorporated in and constitute a part of this specification, illustrate several embodiments of the invention and together with the description, serve to explain the principles of the invention.

DESCRIPTION OF EMBODIMENTS

Figure 1:
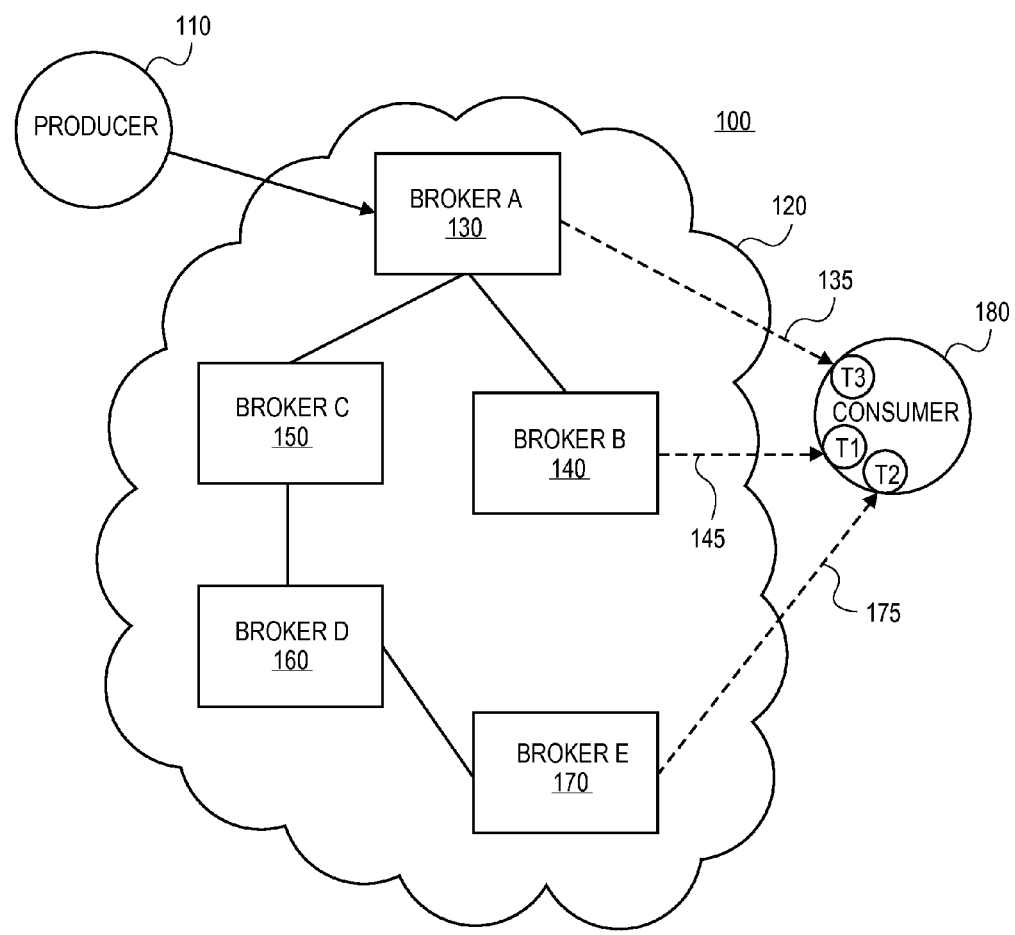
FIG. 1 illustrates an exemplary messaging system, consistent with embodiments of the invention.

Reference will now be made in detail to embodiments of the invention, examples of which are illustrated in the accompanying drawings. Wherever convenient, the same reference numbers will be used throughout the drawings to refer to the same or like parts.

Embodiments consistent with the present teachings relate to systems and methods for dynamic messaging routing that allows a message consumer to create message routing criteria on a destination broker to which they are connected, and receive messages that satisfy the conditions of those criteria not only from the destination broker on which the consumer created the criteria, but also from other brokers that are connected to it.

In various embodiments, brokers coordinate with each other to apply the routing criteria of a destination broker to a source broker, so that any message that would match one of these routing criteria is routed to the destination broker. If routing criteria are added to or removed from the destination broker, these changes are propagated to all connected brokers throughout the network. When a destination broker removes a criteria that allows a specified type of message to pass, the connected brokers follow suit and no longer incur the overhead of transferring messages that match that criteria.

In embodiments that utilize a message queuing protocol, dynamic exchange routes between brokers may be implemented by creating a queue on the source broker to hold messages that are to be routed to the destination broker, binding this queue to a source broker exchange, and subscribing the destination broker to the queue, wherein the binding used to implement a dynamic exchange route on a source exchange are modified if the bindings in the destination exchange change.

According to one embodiment, systems, methods, and computer-readable media are provided for routing messages, which implement operations comprising receiving, by the broker computer and from a network entity, information describing a message consumer; updating routing information of the broker computer to forward messages for the message consumer to the network entity; and transmitting the information describing the message consumer from the broker computer to a second broker computer that is communicatively connected to the broker computer; wherein the second broker computer updates routing information of the second broker computer to forward messages for the message consumer to the broker computer.

Further embodiments provide systems, methods, and computer-readable media, which implement operations comprising determining whether the second broker is communicatively connected to the broker computer; and performing the transmitting only if the second broker is communicatively connected. In still further embodiments, the information describing a message consumer comprises subscription information identifying a type of message that the consumer desires to receive, and the subscription information identifying a type of message comprises a set of matching criteria corresponding to information associated with a message. In yet further embodiments, the second broker computer transmits the information describing the message consumer to a third broker computer that is communicatively connected to the second broker computer; and the third broker computer updates routing information of the third broker computer to forward messages for the message consumer to the second broker computer. In various embodiments, updating routing information comprises: creating a new channel between the broker computer computer and the network entity and/or modifying an existing channel between the broker computer computer and the network entity.

Turning to the drawings, FIG. 1 illustrates an exemplary messaging system 100 consistent with embodiments of the invention. In the embodiment shown, a producer 110 of messages communicates with a consumer 180 of messages via a network 120. In some embodiments, producer 110 may be a data processing system, such a laptop or desk top computer, operated by a user, which sends a message. In other embodiments, producer 110 may be an application or software program running on a data processing system, which sends a message. Similarly, in some embodiments, consumer 180 may be a data processing system, such a laptop or desk top computer, operated by a user, which receives the message from producer 110. In other embodiments, consumer 180 may be an application or software program running on a data processing system, which receives the message from producer 110. No one specific implementation of producer 110 or consumer 180 is critical to the invention.

In the embodiment shown, network 120 is made up of a broker A 130, which communicates with a broker B 140 and a broker C 150, which communicates with a broker D 160, which communicates with a broker E 170. Network 120 may be a private, public, or mixed private and public network. In various embodiments, brokers 130, 140, 150, 160, and 170 may be data processing systems, such a server computers, which are communicatively linked to each other. No one specific implementation of brokers 130, 140, 150, 160, and 170 or connections among brokers, producers, and consumers is critical to the invention. In some embodiments, message transportation connections and communications among brokers, producers, and consumers may be implemented using a known messaging protocol, such as the advanced messaging queuing protocol (AMQP). The topology of the brokers in network 120 is not critical to the invention; for example, brokers 130, 140, 150, 160, and 170 may be connected in a string topology or a ring topology instead of the multi-branch tree topology shown.

As illustrated in FIG. 1, message producer 110 is connected to network 120 via broker A 130. As also illustrated, message consumer 180 may be connected to network 120 via different brokers at different times. For instance, as shown in FIG. 1, consumer 180 may be communicatively connected 145 to broker B 140 at time T1, may be communicatively connected 175 to broker E 170 at time T2, and communicatively connected 135 to broker A 130 at time T3. This may correspond, for example, to a mobile user with a laptop computer (e.g., consumer 180) logging onto and off of various local servers (e.g., broker B 140, broker E 170, and broker A 130) from different locations as the mobile user travels on a business trip. In some embodiments, message producer 110 may similarly connect to and disconnect from various brokers in network 120 at various times.

Embodiments consistent with the invention dynamically route messages from producer 110 to consumer 180 according to the current location where consumer 180 is connected to network 120. For example, at time T1, a message that is bound solely for consumer 180 from producer 110 is transmitted to broker A 130, which routes the message to broker B 140, where consumer 180 consumes the message via connection 145. In the time T1 example, broker A 130 does not route the message to broker C 150 because at time T1 there is no path to consumer 180 through broker C 150.

At later time T2, a message bound solely for consumer 180 from producer 110 is transmitted to broker A 130, which routes the message to broker C 150, which routes the message to broker D 160, which routes the message to broker E 170, where consumer 180 consumes the message via connection 175. In the time T2 example, broker A 130 does not route the message to broker B 140 because at time T2 there is no path to consumer 180 through broker B 140 (although a path via broker B 140 did exist earlier at time T1).

At later time T3, a message bound solely for consumer 180 from producer 110 is transmitted to broker A 130, which holds the message until it is consumed by consumer 180. In the time T2 example, broker A 130 does not route the message to broker B 140 or to broker C 150 because at time T3 there is no path to consumer 180 through broker B 140 or broker C 150 (although paths via broker B 140 and broker C 150 did exist earlier at times T1 and T2). In the embodiment shown, the message routing performed by network 120 is dynamic because the routes change according to changes in the connection location of consumer 180 at various times. Similarly, a change in the connection location of message producer 110 will change the routing.

In various embodiments, when message consumer 180 connects to a broker (such as broker B 140 at time T1), information about that connection is propagated to the other brokers in the network. Thus, network 120 knows where consumer 180 is currently connected, and brokers 130-170 route any messages for consumer 180 to the broker that consumer 180 is currently connected to (such as broker B 140 at time T1). Similarly, information regarding the current connection point of message producer 110, (which may change over time), is propagated to the brokers in network 120. In one embodiment, a message sent to network 120 destined for a specified consumer or consumers is routed or forwarded to other brokers only if there is a downstream consumer or consumers that can receive the message, including in network topologies where messages must make multiple hops to reach a consumer(s), such as consumer 180.

In some embodiments, a message producer 110 may publish a message to network 120 that is destined for any consumer(s) that subscribe to the message. In various of these embodiments, the message is routed or forwarded to each broker only if there is a downstream subscribing consumer or consumers to receive the message, including in network topologies where messages must make multiple hops to reach a subscribing consumer(s).

One of ordinary skill will recognize that the topology, producer connections, consumer connections, and other details of messaging system 100 are exemplary and presented in the form shown for conciseness and ease of illustration. Other components, topologies, connections, etc. may be substituted for those shown without departing from the scope of the invention. In addition, one of ordinary skill will recognize that for implementations with two-way communications, consumer 180 may also be a producer of messages bound for producer 110, and producer 110 may also be a consumer of messages from consumer 180.

U.S. patent application Ser. No. 13/071,243 entitled "Systems and Methods for Providing Distributed Dynamic Routing Using a Logical Broker," by Theodore Ross filed on Mar. 24, 2011, (which is hereby incorporated by reference in its entirety), describes in detail embodiments of dynamically routed messaging systems and messaging networks that provide a single logical broker for a message consumer, regardless of where the consumer connects to the system or network. In addition, U.S. patent application Ser. No. 13/071,277 entitled "Systems and Methods for Routing Messages Exclusively to Eligible Consumers in a Dynamic Routing Network," by Theodore Ross filed on Mar. 24, 2011 (which is hereby incorporated by reference in its entirety), describes further features of a dynamic routing network.

Figure 2:
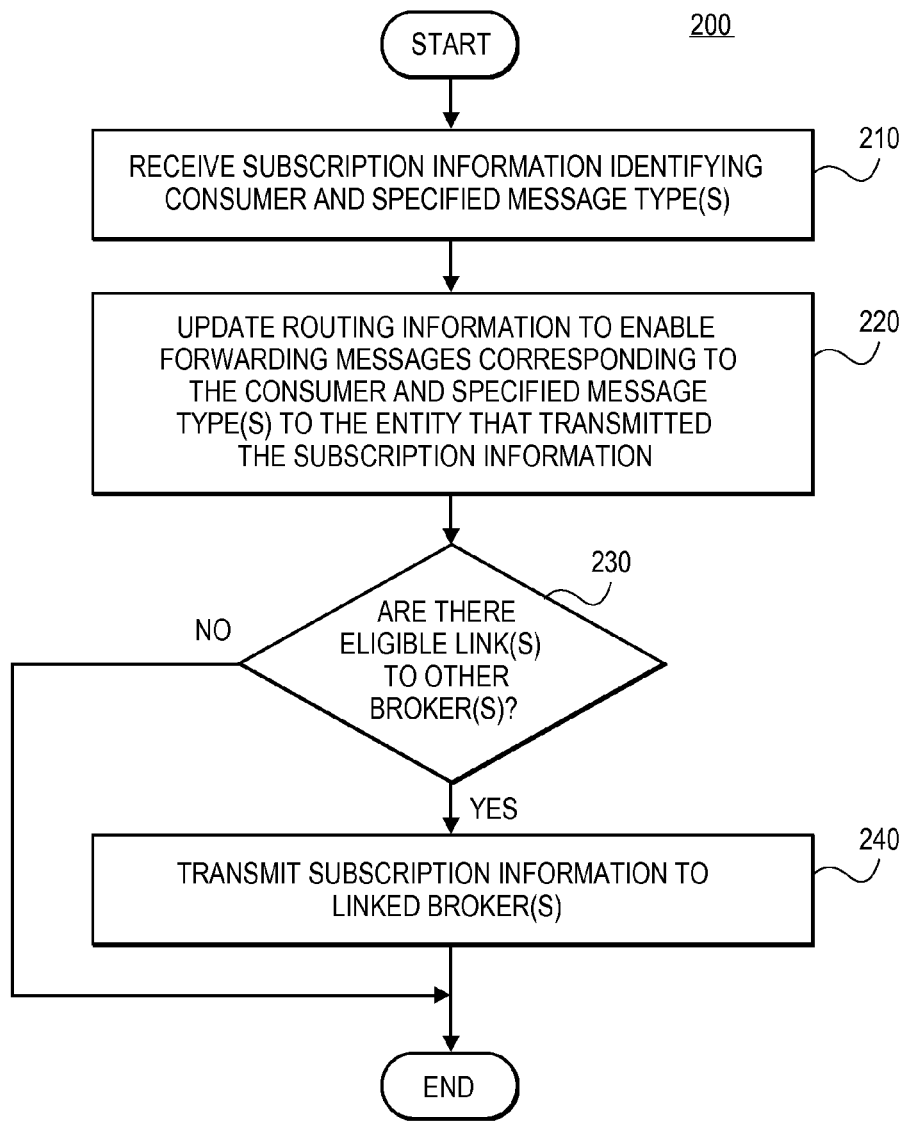
FIG. 2 is a flowchart showing an exemplary process for dynamically updating routing information, consistent with embodiments of the invention.

FIG. 2 is a flowchart showing an exemplary process 200 for dynamically updating routing information, consistent with embodiments of the invention. In various embodiments, process 200 may be implemented by a server computer, or other data processing system, functioning as a broker, such as brokers 130, 140, 150, 160, or 170 of FIG. 1. As shown in FIG. 2, process 200 begins with receiving subscription information that identifies a message consumer, (such as message consumer 180), and identifies the specific type(s) of message(s) associated with the message consumer (stage 210). In various embodiments, the subscription information may include information indicating that a consumer is currently connected to a specific broker and can receive messages via that broker, or the subscription information may include information indicating that a consumer has disconnected from a specific broker and can no longer receive messages via that broker. In various embodiments, the subscription information may be received directly from a consumer or from another broker that is communicatively connected to the broker implementing process 200. In some embodiments, the subscription information may also be received from a producer, for example, in cases where the producer is also a message consumer.

To illustrate stage 210 with reference to FIG. 1, subscription information may be received by broker B 140 from consumer 180 at time T1, and the subscription information may identify consumer 180 as a consumer and identify specific message types that consumer 180 should receive, such as messages addressed to consumer 180, or messages classified as belonging to certain topics specified by consumer 180. For another illustration, broker A 130 may receive subscription information from broker B 140 and/or from broker C 150. In the case of broker C 150, the subscription information may identify any consumers connected to broker C 150, and any consumers connected to brokers that are downstream, such as any consumers connected to broker D 160 and any consumers connected to broker E 170 (i.e., consumer 180 when connected 175 at time T2). Additionally, the subscription information from broker C 150 may include information identifying specific message types that should be delivered to any consumers connected to broker C 150 and/or to any consumers connected to brokers downstream for broker C 150, such as messages addressed to consumer 180, or messages classified as belonging to certain topics specified by consumer 180, while consumer 180 is connected to broker E 170 at time T2.

Referring again to FIG. 2, process 200 continues at stage 220 by updating routing information to enable forwarding of messages that correspond to the subscription information of the entity that transmitted the received subscription information. As noted above, in various embodiments, the entity that transmitted the subscription information may be a consumer connected to a broker that is implementing process 200, or the transmitting entity may be another broker. In various embodiments, a broker's routing information determines whether or not, and to where, the broker forwards messages that it receives.

For example, with reference to FIG. 1, at time T1, the routing information of broker A 130 will direct broker A 130 to forward a message addressed solely to consumer 180 to broker B 140 because the subscription information from broker B 140 at time T1 will indicate that consumer 180 is currently connected to broker B 140. Subsequently at time T3, the routing information of broker A 130 will have been updated to direct broker A 130 to supply a message addressed solely to consumer 180 directly to consumer 180. At time T3, the routing information of broker A 130 will indicate that messages solely for consumer 180 should not be forwarded to broker B 140 or to broker C 150 because the subscription information from broker B 140 at time T3 and from broker C 150 at time T3 will indicate that consumer 180 is neither directly nor indirectly connected to either of these brokers.

For the case wherein the subscription information indicates that a consumer has disconnected from a specific broker and can no longer receive messages via that broker, the broker's routing information is updated such that the broker ceases to forward messages to a broker that formerly, but no longer, was directly or indirectly connected to a consumer of the messages.

At stage 230 in FIG. 2, process 200 determines whether the broker implementing process 200 is linked to eligible brokers other than the entity from which it received the subscription information in stage 210. If there are no eligible links to other brokers (stage 230, no), then process 200 ends. Otherwise, (stage 230, yes), process 200 proceeds to stage 240.

For an example of stage 230 with respect to FIG. 1, at time T1 and assuming that broker A 130 received subscription information from broker B 140, broker A 130 would determine that it has an eligible link to broker C 150; the link to broker B 140 is not an eligible link at time T1 because broker B 140 is the entity from which broker A 130 received the subscription information. Similarly, at time T3 and assuming that broker A 130 received subscription information from consumer 180, broker A 130 would determine that it has eligible links to broker B 140 and to broker C 150.

In the embodiment of FIG. 2 at stage 240, process 200 transmits the subscription information received in stage 210 to the eligible brokers, if any, that are linked to the implementing broker, and then process 200 ends. Continuing one of the examples from the previous paragraph with respect to FIG. 1, at time T3, broker A 130 has determined that it has eligible links to broker B 140 and to broker C 150, and so transmits the subscription information to broker B 140 and to broker C 150. In this example, broker B 140 and broker C 150 would thereafter be able to route any received message for consumer 180 to broker A 130, according to the subscription information.

In some embodiments, process 200 is executed by each broker in a messaging network, so that subscription information related to the dynamic connection, revision of connection parameters, disconnection, and reconnection of consumers (and/or producers and/or brokers), is propagated throughout the network each time a connection, and corresponding subscription information, changes. For instance, continuing the example from the previous paragraph, at time T3, broker C 150 receives the subscription information (stage 210) transmitted from broker A 130, and broker C 150 implements the remainder of process 200, propagating the subscription information to broker D 160, etc.

One of ordinary skill will recognize that stages may be added to, deleted from, or modified within process 200 without departing from the principles of the invention. For example, additional process stages may be added to ensure that subscription information is not propagated in an endless loop through a network that has a ring or other circular topology.

Figure 3:
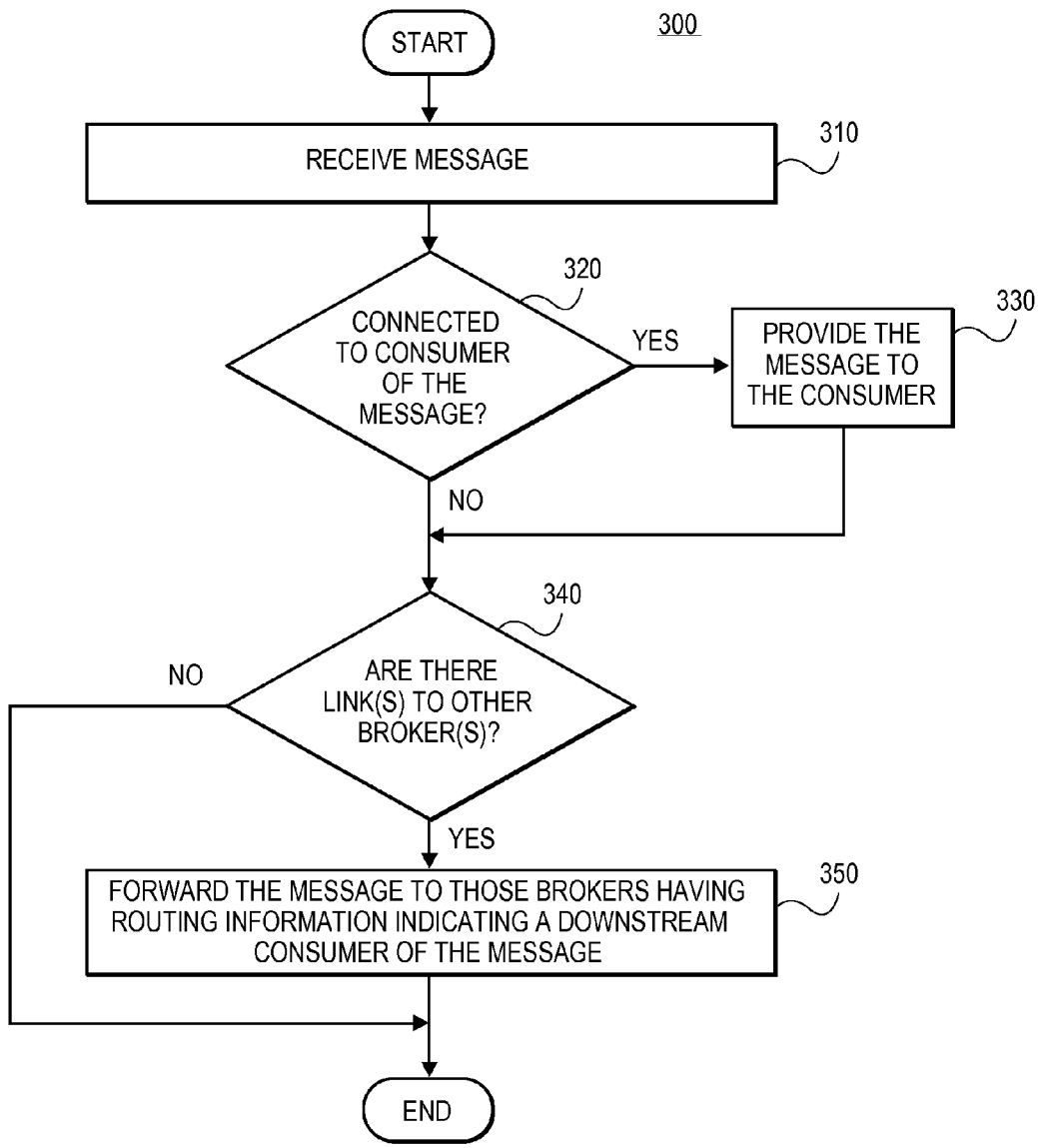
FIG. 3 is a flowchart showing an exemplary process for dynamically routing messages to a consumer, consistent with embodiments of the invention.

FIG. 3 is a flowchart showing an exemplary process 300 for dynamically routing messages to a consumer, consistent with embodiments of the invention. In various embodiments, process 300 may be implemented by a server computer, or other data processing system, functioning as a broker, such as brokers 130, 140, 150, 160, or 170 of FIG. 1. As shown in FIG. 3, process 300 begins by receiving a message (stage 310). The message may be received, for example, from a message producer (e.g., message producer 110) or from another broker.

At stage 320, process 300 determines whether there is a connection to a consumer of the message. In embodiments where a broker is implementing process 300, the broker may examine information that accompanies the message, such as information identifying a specific consumer or group of consumers that is to receive the message, to determine whether there is a connection to a consumer of the message.

For example, with reference to FIG. 1, at time T3, broker A 130 may examine a message received from message producer 110 and determine that the message is bound for consumer 180; broker A 130 may then determine that it is connected (connection 135) to consumer 180 at time T3, and continue processing according to the "yes" branch of stage 320.

In embodiments that utilize the AMQP protocol, broker A 130 may include an exchange (not shown in FIG. 1) that receives the message, wherein the exchange has a binding to a queue for consumer 180, which was created at time T3 when consumer 180 connected and subscribed to broker A 130. In these embodiments, the exchange receives the message and determines that there is queue corresponding to the connected consumer 180, which satisfies the "yes" condition of stage 320.

As shown in the example of FIG. 3, process 300 performs stage 330 from the "yes" branch of stage 320. In stage 330, the message is provided to the consumer of the message. Continuing the example of the previous paragraph with reference to FIG. 1, during time T3 while consumer 180 is connected 135, broker A 130 provides the message to consumer 180. For instance, in an embodiment implemented utilizing a messaging queue protocol, broker A 130 may place the message in a queue (not shown in FIG. 1) for consumer 180, which receives (in a push configuration) or retrieves (in a pull configuration) the message from the queue.

Referring again to FIG. 3, if there is no direct connection to a consumer of the message ("no" branch of stage 320), or after stage 330 completes, then process 300 proceeds to stage 340 and determines whether there are one or more links to one or more other brokers. If there are no links to other brokers (stage 340, "no"), then process 300 ends.

If, on the other hand, there are link(s) to other broker(s), then process 300 forwards the message to the linked brokers that have routing information indicating a direct or indirect connection to one or more consumers of the message (stage 350) and then ends.

For an example with reference to FIG. 1, at time T1, broker A 130 may forward a message from producer 110 addressed to consumer 180 to broker B 140, because at time T1 the subscription information indicating consumer 180's connection 145 to broker B 140 will have been propagated to broker A 130, such that the routing information of broker A 130 indicates that broker B 140 is currently part of a path to consumer 180. In contrast, at time T2, broker A 130 may forward a message from producer 110 addressed to consumer 180 to broker C 150, because at time T2 the subscription information indicating consumer 180's connection 175 to broker E 170 will have been propagated to broker A 130, such that the routing information of broker A 130 indicates that broker C 150 is currently part of a path to consumer 180. Thus, the routing information maintained by the brokers adapts dynamically as the network configuration changes, for example, when consumer 180 connects to or disconnects from a broker at different times.

In some embodiments, such as embodiments based on messaging systems having a message routing mechanism, (e.g., an AMQP-based implementation), process 300 includes special binding-propogation considerations for inter-broker message routing, such that inter-broker message routing may be handled normally, with the desired dynamic routing effect resulting from the configuration of the brokers (e.g., the dynamically propagated bindings).

One of ordinary skill will recognize that stages may be added to, deleted from, or modified within process 300 without departing from the principles of the invention. For example, additional processing stages may be added to store a message for a period of time, or to forward a message to a specified location, in the case where there is neither a connected consumer nor a link to a broker that is connected directly or indirectly to a consumer.

FIGS. 4A-4D are block diagrams showing an exemplary detailed messaging system 400, consistent with embodiments of the invention. In some embodiments, broker A 130 and broker B 140 shown in FIGS. 4A-4D may implement process 200 and/or process 300, as shown in FIGS. 2 and 3.

Figure 4A:
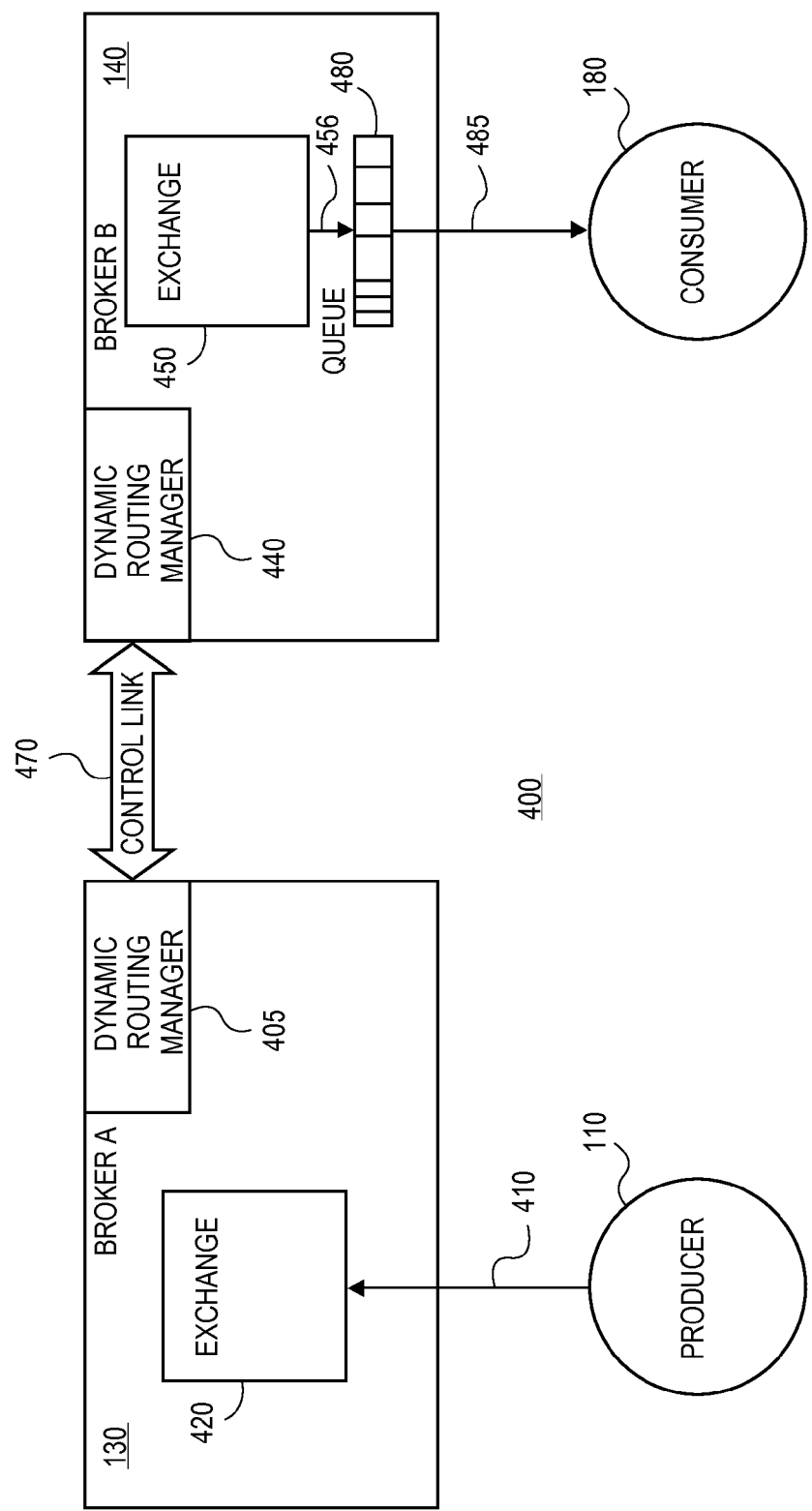
FIGS. 4A-4D are block diagrams showing an exemplary detailed messaging system, consistent with embodiments of the invention.

In the embodiment shown in FIG. 4A, broker B 140 includes an exchange 450. In the example shown, consumer 180 has just connected (connection 485) to broker B 140 and subscribed to exchange 450. Broker B 140 has created queue 480 for messages that are bound for consumer 180. A binding 456 is created between exchange 450 and queue 480 based on the subscription information provided by consumer 180. In various embodiments, exchanges accept messages, examine them, and route them to the appropriate queues. The binding between exchanges and message queues defines the routing criteria, based on information in a message and/or information that accompanies the message. For example, the binding may be implemented by a binding key that specifies a set of matching criteria, and the exchange may route a message to a queue associated with the binding key based upon whether or not information in the message header (e.g., a routing key or other field), or information in the message content, matches the binding key, either exactly or partially. Queues store messages, for example in memory or on disk, usually until they are consumed. In the example shown, messages are received by exchange 450, and exchange 450 uses binding 456 to determine whether or not to route a message to queue 480 for consumption by consumer 180.

In the embodiment of FIG. 4A, broker B 140 includes a dynamic routing manager 440 and a control link 470 linking broker B 140 with broker A 130. In various embodiments, dynamic routing manager 440 uses control link 470 to transfer control and routing-related information, such as subscription information, between brokers. For example, dynamic routing manager 440 may pass subscription information representing the connection 485 and/or binding 456 between broker B 140 and consumer 180 to broker A 130 using control link 470. In various embodiments, dynamic routing manager 440 may be implemented as a software program or application, as a subprogram, or in hardware or firmware.

As shown, broker A 130 includes its own dynamic routing manager 405, which communicates with dynamic routing manage 440 via control link 470. For example, dynamic routing manager 405 receives the control and routing-related information, (e.g., subscription information) transmitted by dynamic routing manage 440, and acts upon the information, as explained in detail below. Broker A 130 also includes an exchange 420 and exchange 420 receives messages produced by message producer 110 via connection 410. In some implementations that are built on top conventional messaging protocols, when creating the brokers that make up the dynamic routing network, the type and name of the exchange should be the same on each broker. For instance, if the source exchange is a direct exchange, the destination exchange should also be a direct exchange, and the names of the exchanges should match.

Figure 4B:
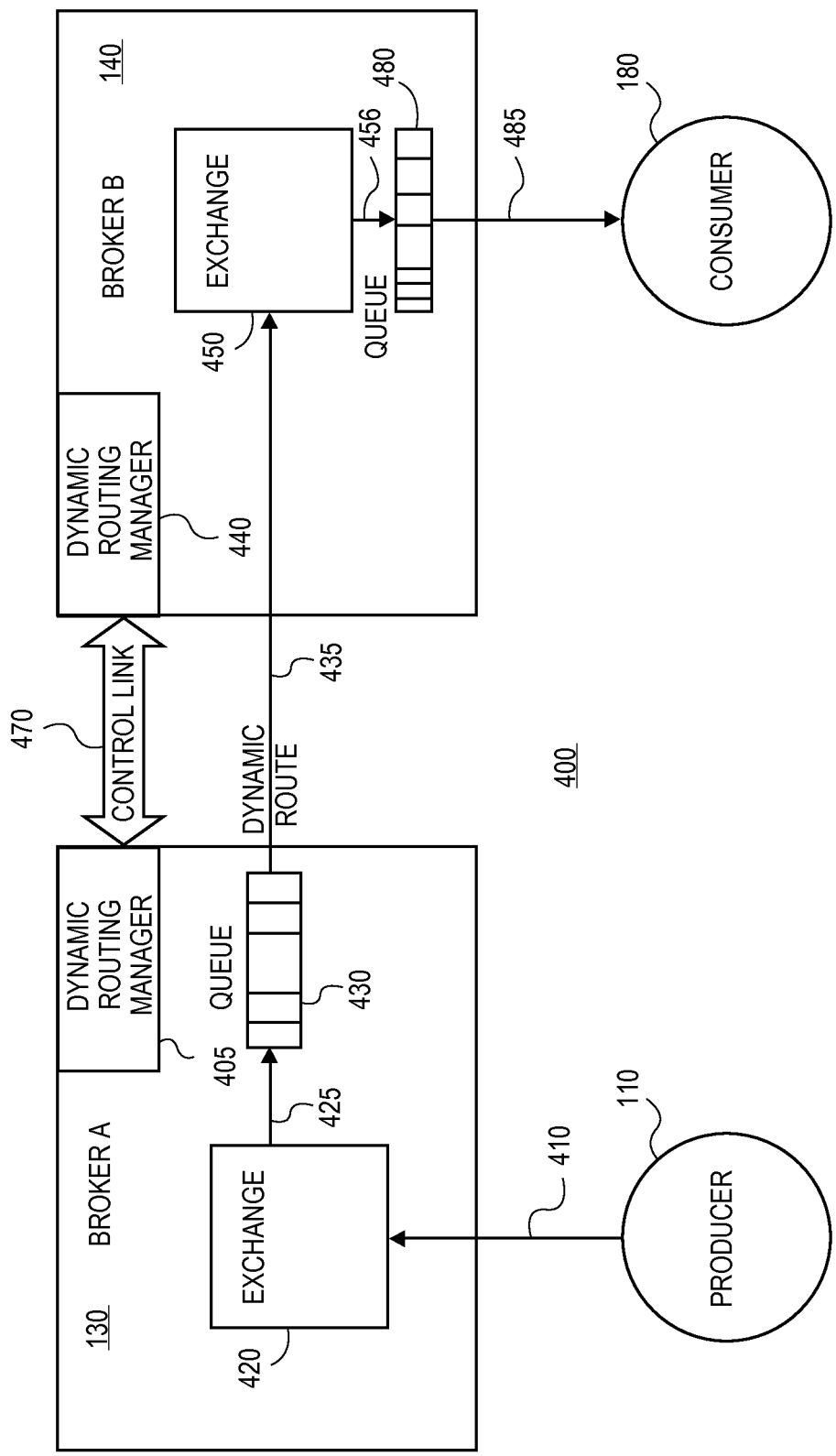

FIG. 4B is a block diagram showing the exemplary detailed messaging system 400 of FIG. 4A at a later time, consistent with embodiments of the invention. In the example shown in FIG. 4B, dynamic routing manager 405 has received the subscription information regarding consumer 180 via control link 470 and instigated creation of queue 430 for messages routed to broker B 140. In various embodiments, queue 430 is preferably a "pull" queue exclusively for use by broker B 140, such that messages remain in queue 430 until broker B 140 requests or "pulls" them from the queue, as represented by dynamic route 435. In the embodiment shown, a binding 425 is created between exchange 420 and queue 430 based on the subscription information received from broker B 140 via control link 470. Queue 430 may be accessed by exchange 450, as represented by dynamic route 435. Thus, a new channel comprising, in this embodiment, binding 425, queue 430, and dynamic route 435 has been created to route messages for consumer 180 to broker B 140.

For instance, a message, for example a message from producer 110, may be received by exchange 420, and exchange 420 uses binding 425 to determine whether or not to route the message to queue 430 for transfer via dynamic route 435 to broker B 140 and eventually to consumer 180. Thus, in this example, broker A 130 is the source of messages, such that it may be referred to as the source broker and exchange B20 may be referred to as the source exchange, while broker B 140 may be referred to as the destination broker and exchange 450 may be referred to as the destination exchange.

In some embodiments, the message channel provided by binding 425, queue 430, and dynamic route 435 is durable. In such embodiments, the queue used to store messages for the connection (i.e., queue 430) on the source broker (i.e., broker A 130) is durable in that if the communication connection between the brokers is lost, messages for the destination exchange (i.e., exchange 450) continue to accumulate in the queue's storage space until the communication connection is restored.

As illustrated by the embodiments shown in FIGS. 4A-4D, when a consuming client (e.g., consumer 180) binds a queue to an exchange, information about that binding is propagated to the other brokers in the network, (for example, via dynamic routing managers and control links), to ensure that any messages matching the binding will be forwarded to the consuming client's current local broker. In some embodiments, messages published to a network exchange (e.g., exchange 420) are forwarded to other brokers only if there are remote consumers to receive the messages. In these embodiments, the dynamic binding changes ensure that messages are routed only to brokers with eligible consumers. This includes topologies where messages must make multiple hops to reach the consumer.

Figure 4C:
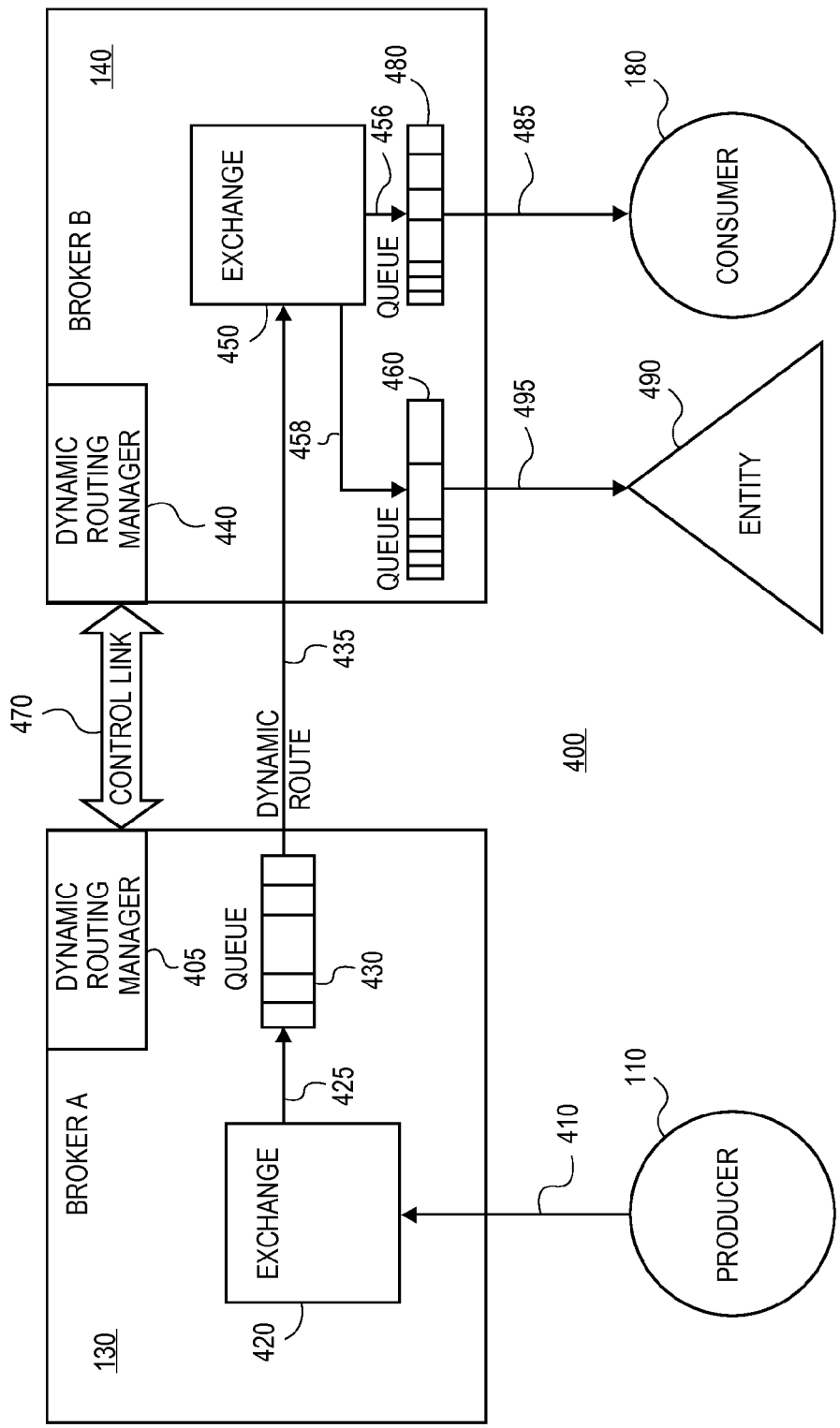

FIG. 4C is a block diagram showing the exemplary detailed messaging system 400 of FIG. 4B at a later time, consistent with embodiments of the invention. In the example shown in FIG. 4C, entity 490 has connected to broker B 140 and subscribed to exchange 450. Entity 490 may be another consumer, like consumer 180, or another broker, which may have downstream consumers or brokers attached to it, or an entity that is both a message consumer and a message producer. Broker B 140 has created queue 460 for messages that are bound for entity 490.

A binding 458 is defined between exchange 450 and queue 460 based on the subscription information provided by entity 490. In the case where entity 490 is a broker, there may be a control link (not shown) between entity 490 and broker B 140, similar to control link 470, that is used to exchange subscription information. When a message is received by exchange 450 of broker B 140, exchange 450 uses binding 458 to determine whether or not to route the message to queue 460 for entity 490 and uses binding 456 to determine whether or not to route the message to queue 480 for consumer 180. In various embodiments, queue 460 is preferably a pull queue, such that messages remain in queue 460 until entity 490 requests or pulls the messages from the queue.

In some embodiments consistent with the invention, dynamic routing manager 440 of broker B 140 passes the subscription information related to entity 490 to dynamic routing manager 405 of broker A 130 via control link 470. In one embodiment, dynamic routing manager 405 may update the existing channel between broker A 130 and broker B 140 by modifying the binding 425 between exchange 420 and queue 430 according to the received subscription information related to entity 490, such that both messages bound for consumer 180 and messages bound for entity 490 are routed to queue 430, where they are available to exchange 450 via dynamic route 435. In another embodiment, dynamic routing manager 405 may leave the binding 425 between exchange 420 and queue 430 unchanged, and create a new channel by instigating creation of a new binding (not shown) and a new queue (not shown) according to the received subscription information related to entity 490, such that messages bound for consumer 180 are routed to queue 430 and messages bound for entity 490 are routed to the new queue (not shown). In either case, the routing of messages from broker A 130 dynamically changes as the connections to broker B 140 change.

A similar process occurs if an existing, connected consumer or entity modifies its bindings for an exchange—i.e., this causes the modification of the bindings on other brokers having dynamic routes to that exchange. A consumer does not have to disconnect to cause changes to the networks dynamic routing. For example, if consumer 180 modifies binding 456 (for example, to unsubscribe to a specific topic, so as not to receive messages published under that topic), then information representing that binding modification would be passed via control link 470 to dynamic routing manager 405 of broker A 130, which would similarly modify binding 425.

Figure 4D:
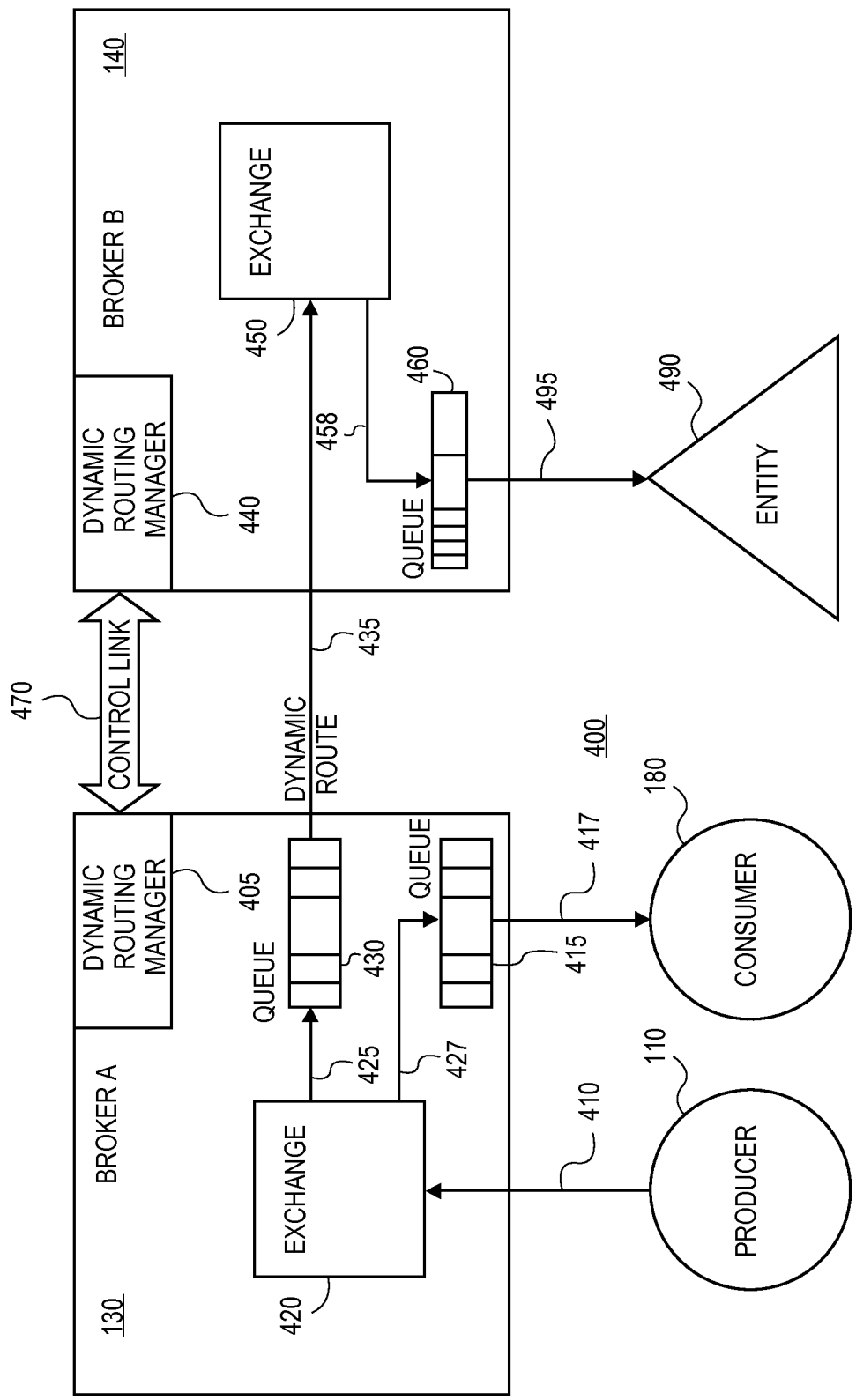

FIG. 4D is a block diagram showing the exemplary detailed messaging system 400 of FIG. 4C at a later time, consistent with embodiments of the invention. In the example shown in FIG. 4D, consumer 180 has disconnected from broker B 140 and connected (connection 417) to broker A 130.

In the example shown, when consumer 180 disconnects from broker B 140, broker B 140 updates its routing information to remove binding 456 (no longer shown) and queue 480 (no longer shown). Dynamic routing manager 440 of broker B 140 also sends subscription information to dynamic routing agent 405 of broker A 130 via control link 470. In one embodiment, this subscription information indicates that consumer 180 is no longer connected to, and receiving message via, broker B 140. In this case, the subscription information indicates that the dynamic route via broker B 140 to consumer 180 should be torn down, because consumer 180 is no longer connected. In the embodiment shown, in response to the received subscription information, dynamic routing manager 405 updates binding 425 such that messages solely for consumer 180 are no longer routed to queue 430 for transfer to broker B 140, because consumer 180 is no longer connected to, and consuming messages via, broker B 140.

In the example shown in FIG. 4D, consumer 180 has subscribed to exchange 420 of broker A 130. Broker A 130 has created queue 415 for messages that are bound for consumer 180. Broker A 130 has also created a binding 427 between exchange 420 and queue 415 based on the subscription information provided by consumer 180.

When a message is received by exchange 420, exchange 420 may route the message to queue 415 if the message meets the criteria specified by binding 427. In some embodiments, queue 415 is preferably a pull queue, such that messages remain in queue 415 until consumer 180 requests or pulls the messages from the queue via connection 417.

In various embodiments consistent with the invention, dynamic routing manager 405 may pass the subscription information related to newly connected 417 consumer 180 to dynamic routing manager 440 of broker B 140 via control link 470. In response, dynamic routing manager 440 of may instigate creation of a new dynamic route (not shown) to exchange 420, a new queue (not shown) on broker B 140, and a new binding (not shown) between the new queue and exchange 450, similar to binding 425, queue 430, and dynamic route 435, but in the opposite direction. The new dynamic route (not shown), new queue (not shown), and new binding (not shown) may be created by broker B 140 in a manner similar to that previously described with respect to broker A 130 in FIG. 4B, when dynamic routing manager 405 of broker A 130 received subscription information regarding the connection of consumer 180 to broker B 140.

The new dynamic route (not shown), new queue (not shown) and new binding (not shown) from broker B 140 to broker A 130 are used to route any messages for consumer 180 received by broker B 140 (e.g., from entity 490, or from an entity downstream of entity 490, or from a new producer that connects to broker B 140) to consumer 180 via its connection 417 to broker A 130.

In the example of FIG. 4D, a message for consumer 180 from producer 110 is received by exchange 420, which routes the message to queue 415 according to binding 427. Exchange 420 no longer routes messages for consumer 180 to queue 430 because binding 425 changed to prevent this routing when dynamic routing manager 440 sent subscription information indicating that consumer 180 was no longer connected to broker B 140. Thus, the routing of messages bound for consumer 180 is controlled by bindings that dynamically track and adapt to changes in the network.

Thus, in the exemplary scenario illustrated by FIGS. 4A-4D, consumer 180 may use a key that uniquely identifies it (for example, an email address) and binds its current queue to the key as a way of telling the messaging system 400 that it wishes to receive messages according to the key. When consumer 180 moves, a binding is torn down and subsequently created on a different broker, and the dynamic routing algorithm rearranges the configuration of binding keys in system 400 such that consumer 180 will receive its messages at the current broker.

One of ordinary skill will recognize that the system 400 and the examples presented in FIGS. 4A-4D are presented simply for conciseness and clarity of explanation, and that embodiments consistent with the invention include much more complicated embodiments with many more entities connected to broker A 130 and/or broker B 140, including many more producers and consumers, combined producers/consumers, and many additional brokers (for example, as shown in FIG. 1). One of ordinary skill will also recognize that the presented examples of one-way, one-to-one communication from producer 110 to consumer 180 also are used for conciseness and ease of explanation, and that embodiments consistent with the invention include embodiments that perform two-way communication between entities that are both message consumers and message producers, as well as embodiments for publishing a message that is consumed by many consumers (1-to-n messaging). In addition, one of ordinary skill will recognize that for topologies with multiple brokers, the propagation of subscription information via control links occurs repeatedly until all the brokers in the network have updated their routing information, as described, for example, with respect to process 200 of FIG. 2.

FIGS. 5A-5D are block diagrams showing an exemplary messaging system, consistent with embodiments of the invention. In some embodiments, upstream broker 530 and downstream broker 540 shown in FIGS. 5A-5C may implement processes similar to or the same as process 200 and/or process 300, as shown in FIGS. 2 and 3. As shown in FIGS. 5A-5D, some embodiments consistent with the invention do not utilize a control link 470.

Figure 5A:
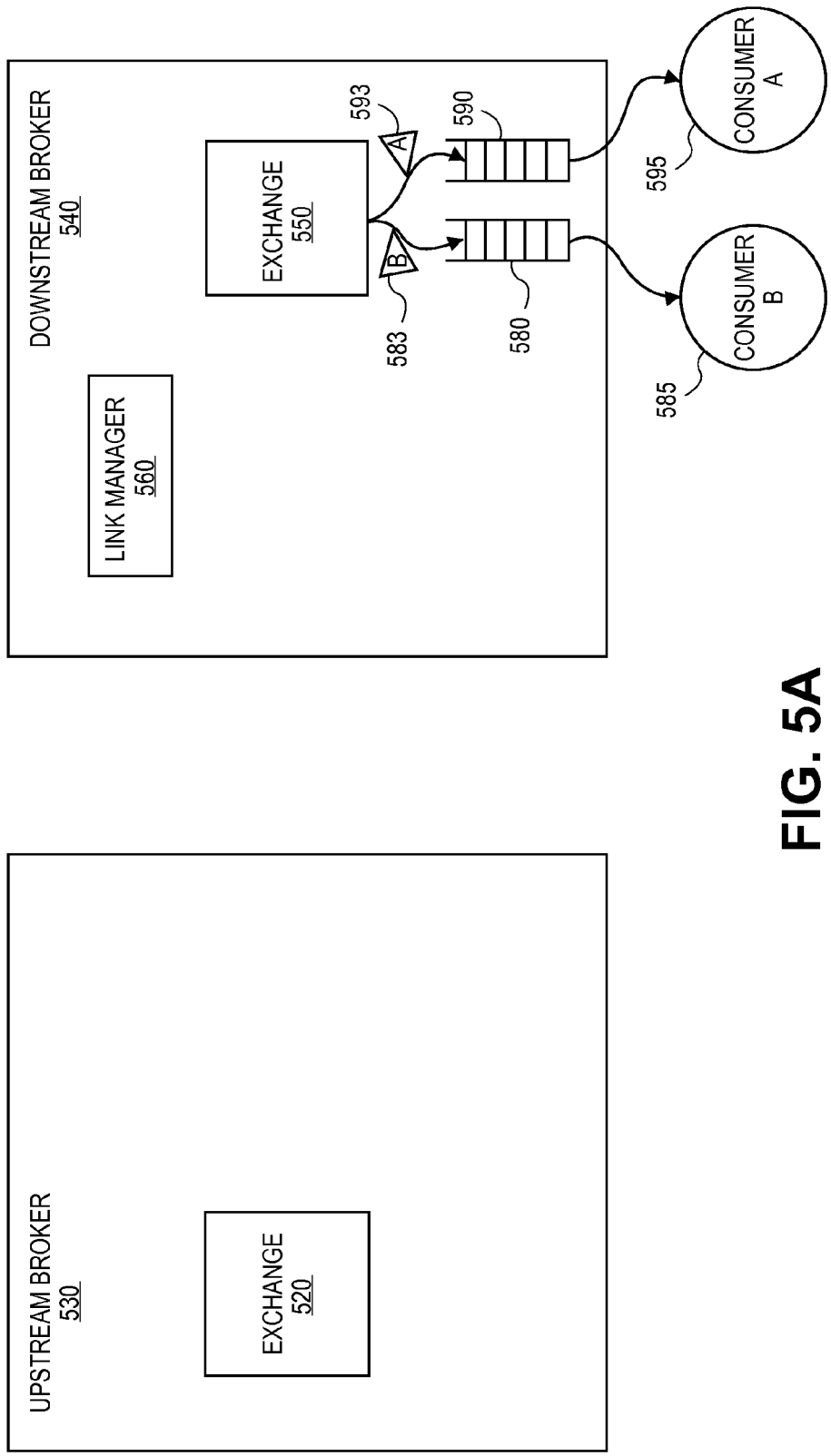
FIGS. 5A-5D are block diagrams showing a second exemplary messaging system, consistent with embodiments of the invention.

For example, as shown in the embodiment of FIG. 5A, there are two brokers, upstream broker 530 and downstream broker 540, which are not yet linked. Upstream broker 530 includes an exchange 520, but there is no connection between upstream broker 530 and downstream broker 540 in this example.

Downstream broker 540 includes a link manager 560, (which will be explained further below), and an exchange 550. In the example shown, consumer B 585 is connected to downstream broker 540 and subscribed to exchange 550. Downstream broker 540 has created queue 580 for messages that are bound for consumer B 585. A binding based on binding key B 583 is created between exchange 550 and queue 580 based on the subscription information provided by consumer B 585 and represented in binding key B 583. In the example shown, messages may be received by exchange 550, and exchange 550 uses binding key B 583 to determine whether or not a message matches the binding criteria, and if so, to route the message to queue 580 for consumption by consumer B 585.

Similarly, consumer A 595 is connected to downstream broker 540 and subscribed to exchange 550. Downstream broker 540 has created queue 590 for messages that are bound for consumer A 595. A binding based on binding key A 593 is created between exchange 550 and queue 590 based on the subscription information provided by consumer A 595 and represented in binding key A 593.

Figure 5B:
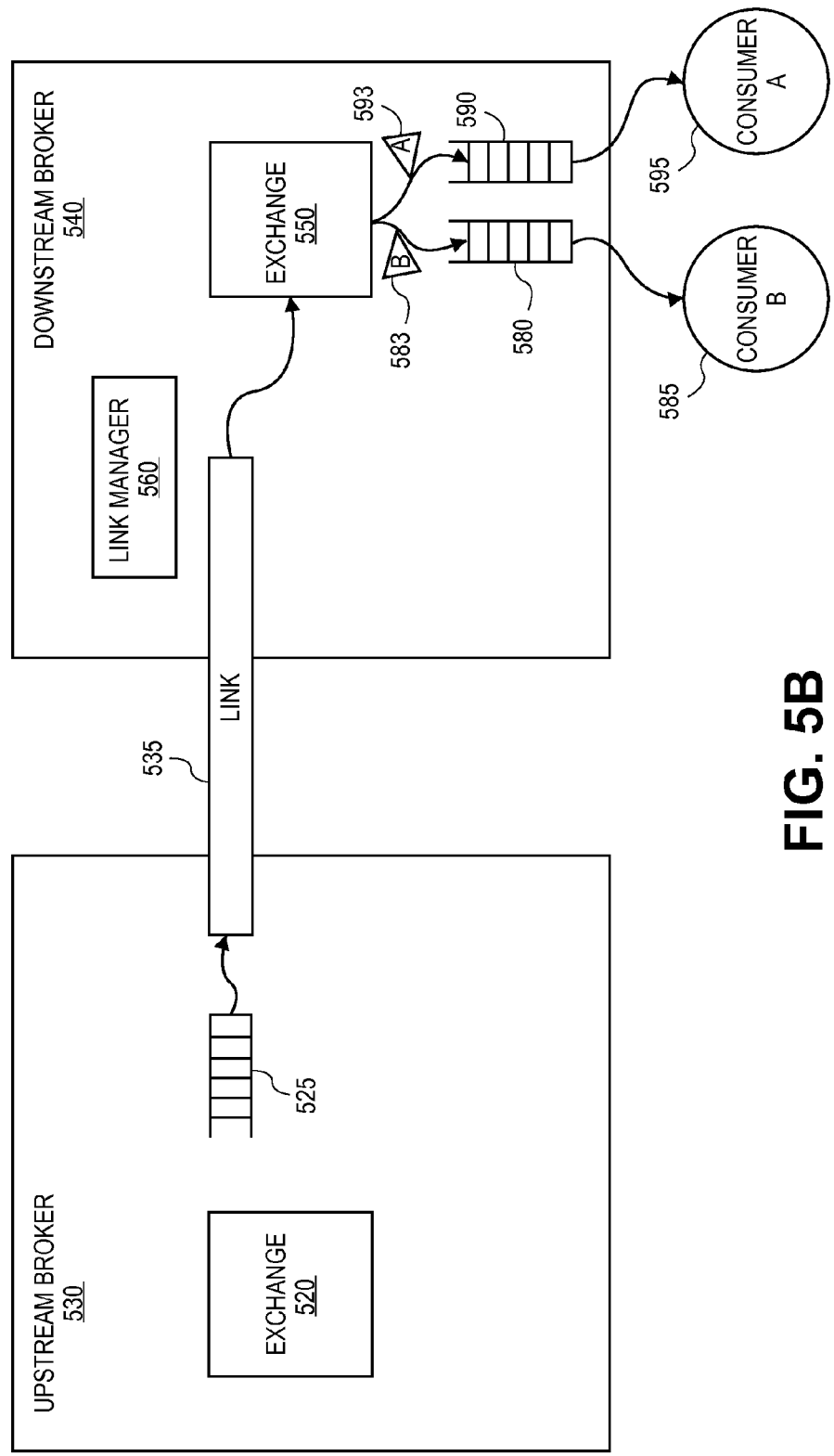

FIG. 5B illustrates the addition of a link 535 between the brokers. In this embodiment, the downstream broker 535 behaves like a consumer (for example, like a standard AMQP client) to the upstream broker 530. For example, as shown, downstream broker 540 has it's own queue 525 on the upstream broker 530, which is used for messages that are sent across the link 535 to the exchange 550 of downstream broker 540.

Figure 5C:
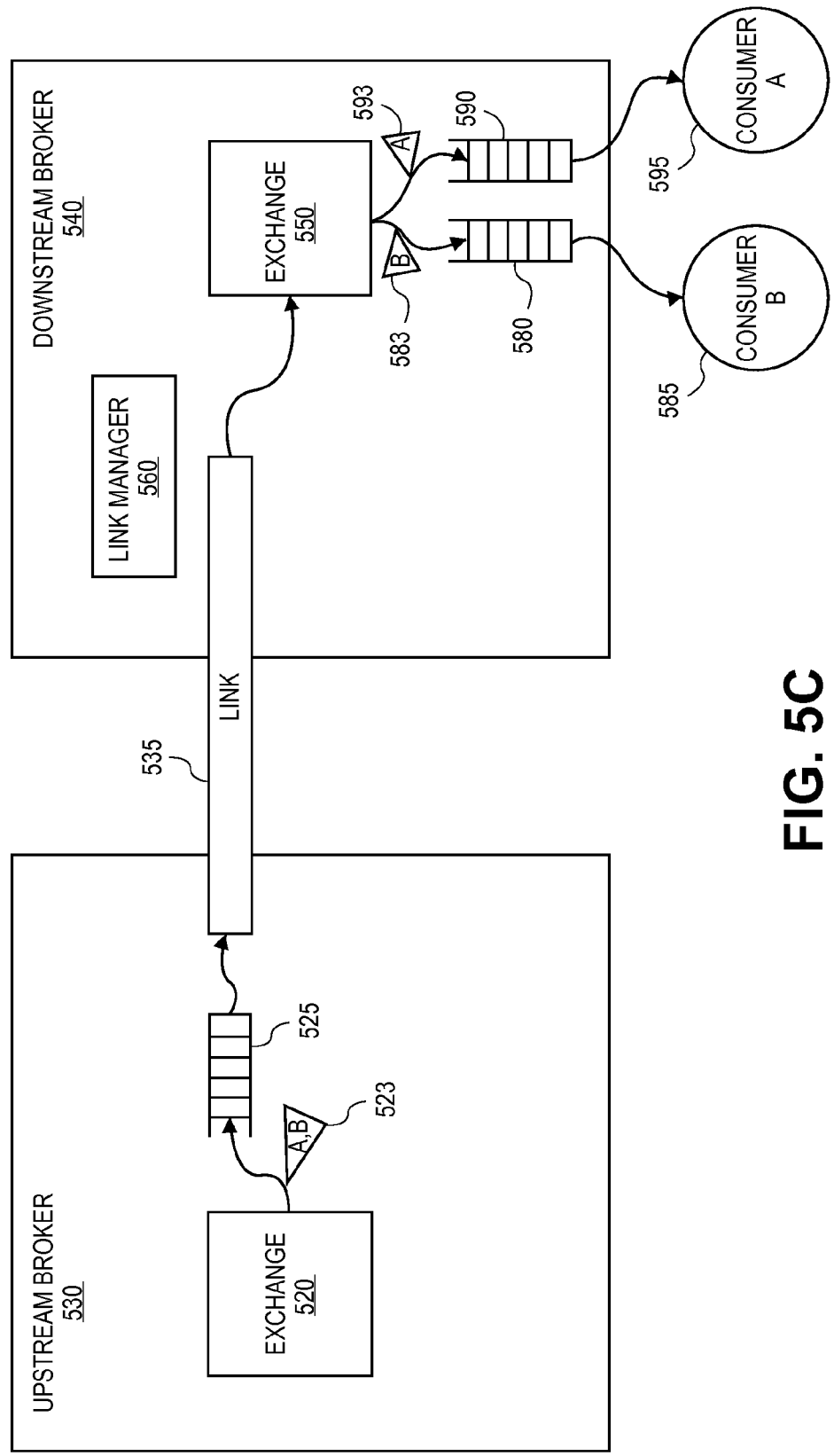

FIG. 5C shows the result of the dynamic propagation of bindings from downstream broker 540 to upstream broker 530. In this example, link manager 560 subscribes to exchange 520 of upstream broker 530 using the binding keys that comprise the subscriptions to exchange 550 of downstream broker 540. In the example shown, the binding keys for exchange 550 are binding key A 583 and binding key B 593. Accordingly, the binding key AB 523 created for queue 525 on upstream broker 530 is a combination of binding key A and binding key B. In other words, the binding keys associated with downstream broker 540 were propagated to upstream broker 530. Any message received by exchange 520 of upstream broker 530 matching either "A" or "B" are copied to the queue 525 for transmission to downstream broker 540, because downstream broker 540 has consumers interested in messages corresponding to those keys. As illustrated in this example, a link 535 is unidirectional.

In certain embodiments, binding key AB 523 may be annotated as being "dynamically propagated" as opposed to "having locally connected consumers." This distinction may be used to properly react to the loss of link 535. This is explained in detail below with respect to FIGS. 6A and 6B, where there is one original or initial binding for a consumer that is locally or directly connected to a broker in the network (such as the rightmost binding 655 between broker B7 640 and consumer 650), and all the other bindings 655 are propagated versions of that original or initial binding. A topology change to network 600 causes a change in the propagated versions of the original or initial binding that are spread throughout the brokers of network 600, as illustrated in the example of FIG. 6B. The propagated versions of the binding 655 are dynamically removed if they cannot trace a connection path to the consumer 650 because they are not associated with any local consumer connected to their brokers.

Figure 5D:
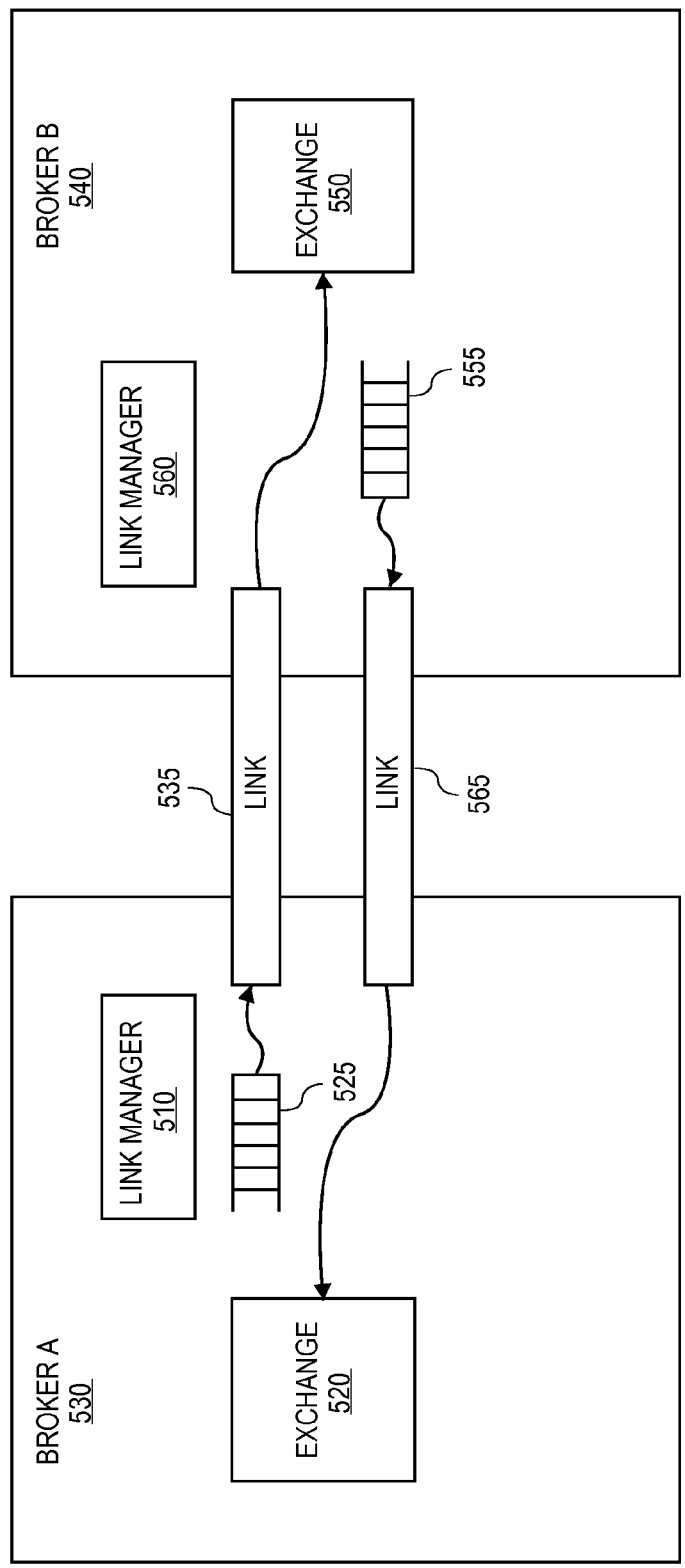

FIG. 5D illustrates the uni-directional nature of the linkage between two brokers. As shown, link 535 moves messages from broker A 530 to broker B 540, and with respect to link 535, broker A 530 is upstream of broker B 540. Similarly, link 565 moves messages from broker B 540 to broker A 530, and with respect to link 565, broker A 530 is downstream of broker B 540. Most networks will have pairs of unidirectional links (i.e., a bidirectional link pair) created between pairs of connected brokers. Is some embodiments for such networks, operations to propagate bindings from broker to broker are performed independently for each half of the bidirectional link pair.

Figure 6A:
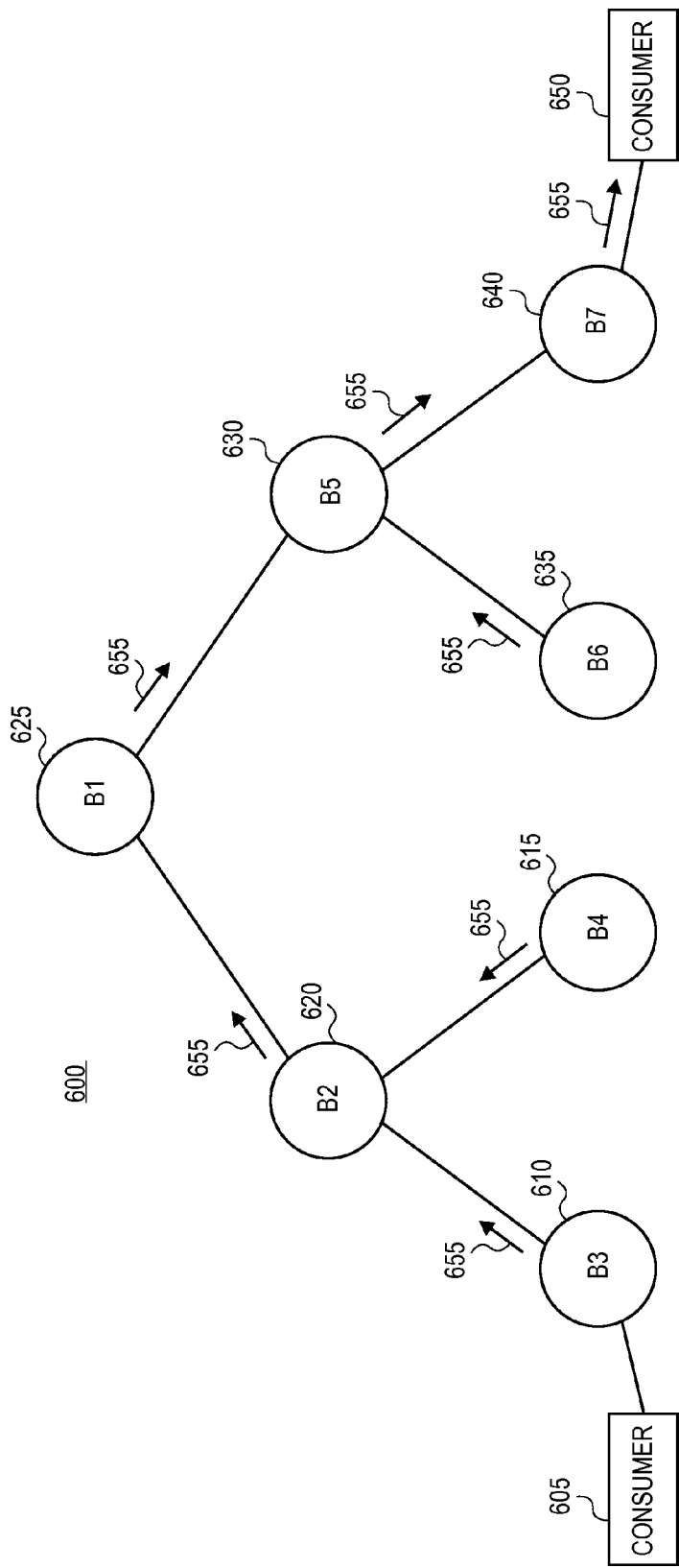
FIGS. 6A-6B are diagrams showing an exemplary network of brokers in different states, consistent with embodiments of the invention.
Figure 6B:
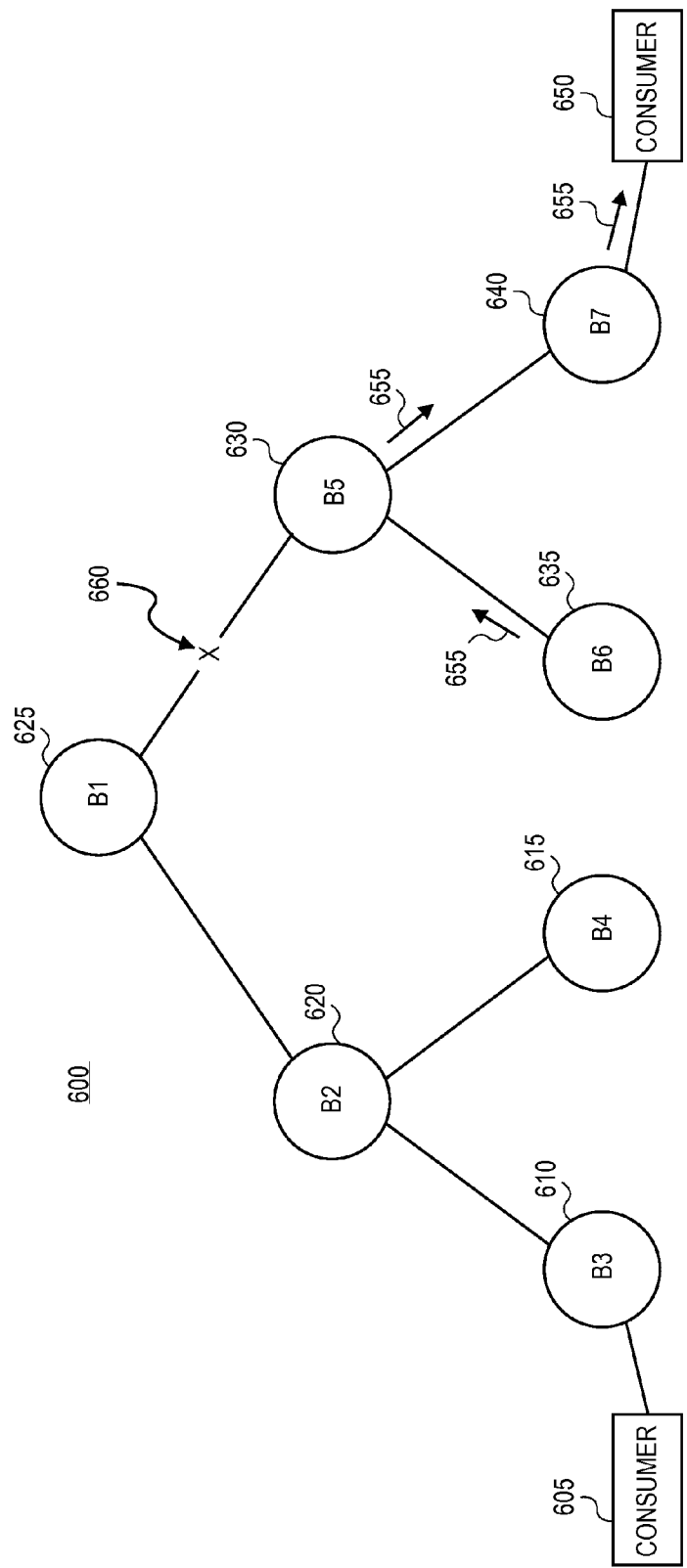

FIGS. 6A-6B are diagrams showing an exemplary network 600 of brokers in different states, consistent with embodiments of the invention. FIG. 6A illustrates a more complex network 600 of brokers than the two brokers shown in FIGS. 5A-5D. As shown, FIG. 6A shows a network 600 of seven brokers: broker B1 625, broker B2 620, broker B3 610, broker B4 655, broker B5 630, broker B6 635, and broker B7 625. A consumer 650 is connected to broker B7 640 using a binding to a key. The consumer 655's binding to the key are represented by an arrow 655. The head of arrow 655 points to the broker/client that wants to receive messages with the key and the tail of the arrow points to the broker with the binding. In the embodiment shown, the lines connecting the brokers represent a bidirectional pair of links.

FIG. 6A shows the steady state of network 600 when the binding 655 has been propagated to all of the brokers in network 600. In the embodiment shown, if a message matching the key is received by any broker in the network 600, then that message will find its way through network 600 to consumer 650. For example, if consumer 605 produces a message that is received by broker B3 610, then that message will be passed from broker B3 610 to broker B2 620 to broker B1 625 to broker B5 630 to broker B7 640 and finally to consumer 650 according to the direction of binding key arrows 655.

FIG. 6B illustrates network 600 when a breakage 660 occurs in the link between broker B1 625 and broker B5 630. Breakage 660 changes the configuration of network 600, partitioning it into two disjoint networks. Because of breakage 660, the net on the left of FIG. 6B (broker B1 625, broker B2 620, broker B3 610, and broker B4 655) has no consumers interested in the key. As shown, a dynamic propagation of binding information (in this case, the lack of a binding to key 655 caused by breakage 660) has occurred, starting with broker B1 655, and reconfigured all brokers in the left-hand net to remove all bindings to the key 655. Thus, messages do not get sent to brokers that do not have interested consumers, either directly connected or somewhere downstream. In contrast, the net on the right of FIG. 6B (broker B5 630, broker B6 635, and broker B7 625) maintains the dynamic bindings to the key 655.

Figure 7A:
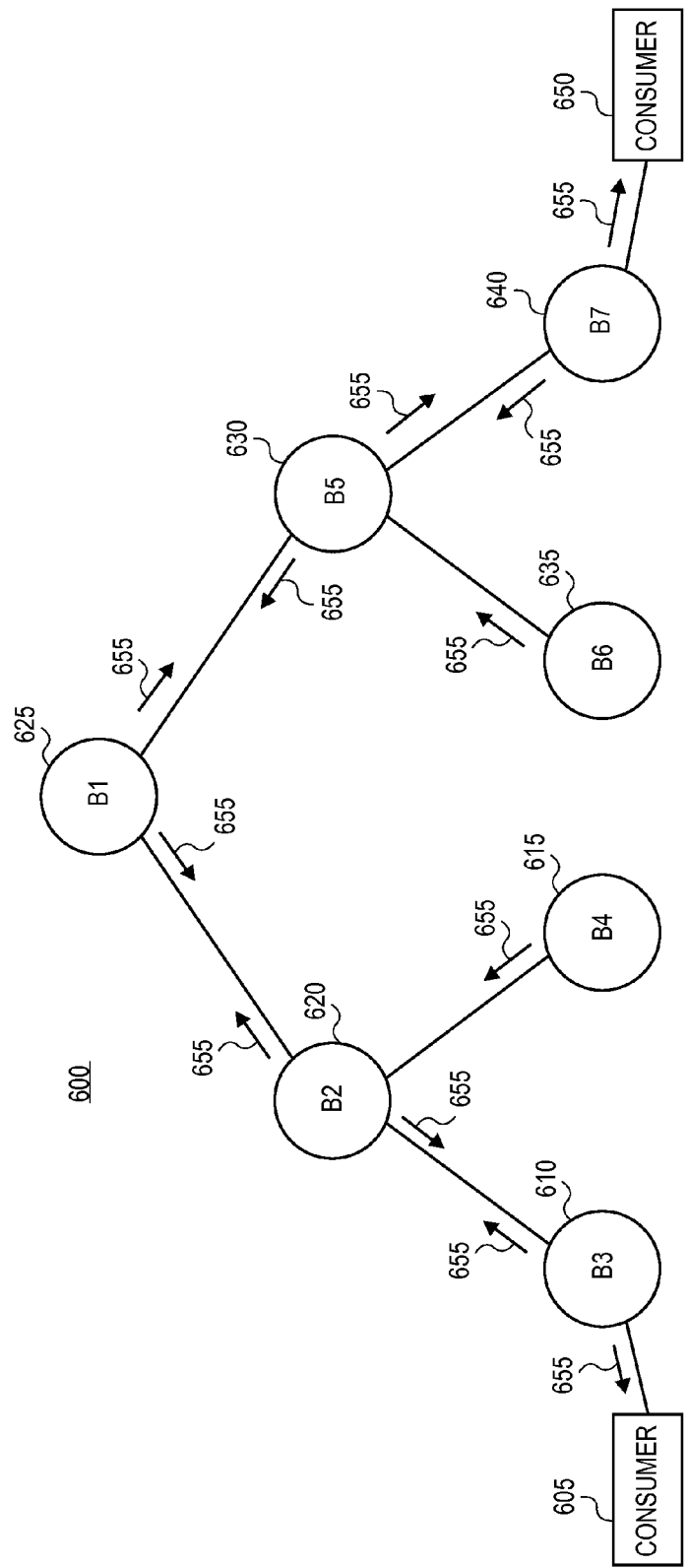
FIGS. 7A-7B are diagrams showing an exemplary network of brokers in different states, consistent with embodiments of the invention.
Figure 7B:
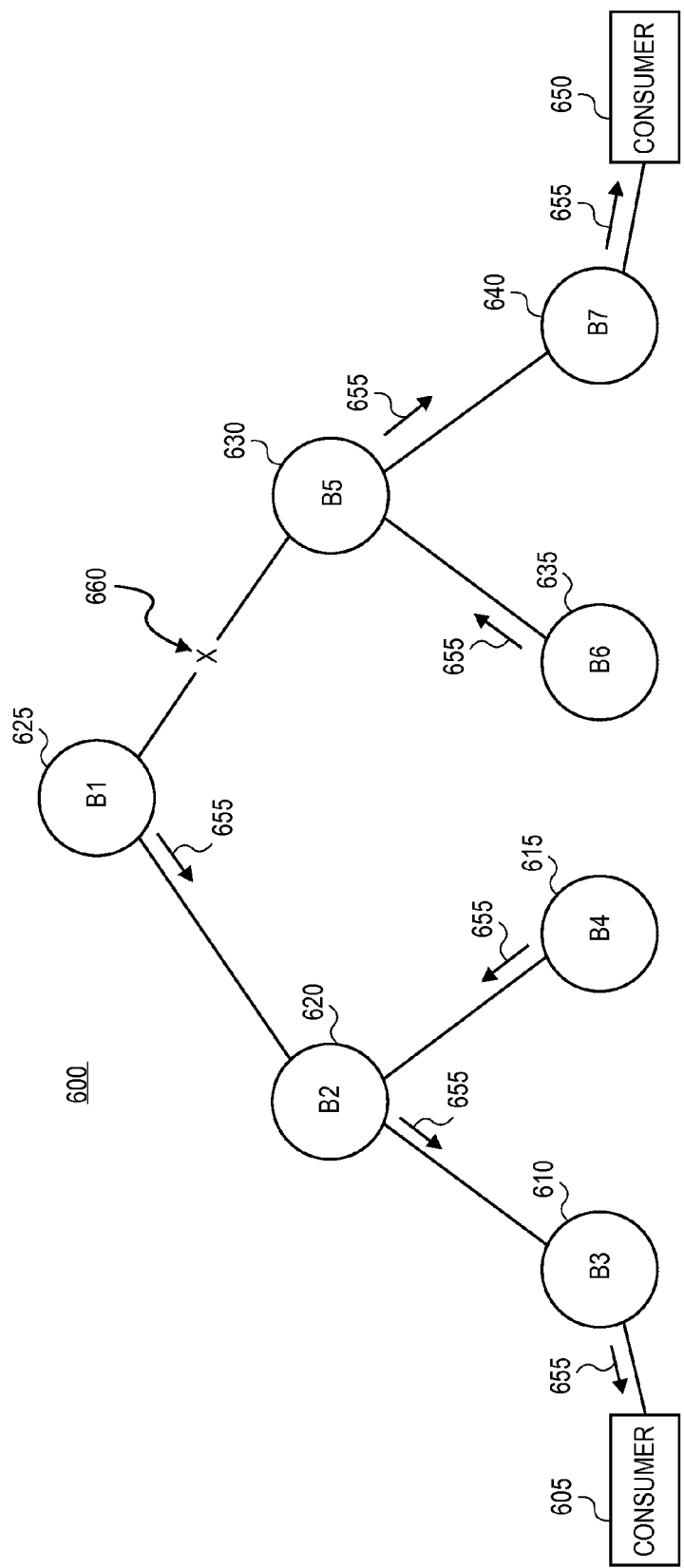

FIGS. 7A-7B are diagrams showing an exemplary network 600 of brokers in different states, consistent with embodiments of the invention. As shown, network 60 is the same network illustrated in FIGS. 6A and 6B with only a single consumer 650, but in FIGS. 7A and 7B there is another consumer 605 that also wishes to receives messages with the same key 655.

FIG. 7A shows the steady state of network 600 with the dynamically created bindings. As shown, several new bindings to key 655 have been propagated from broker B3 610 throughout network 600 to direct messages matching key 655 produced anywhere in network 600 to both broker B3 610 and broker B7 640 for delivery to consumer 605 and consumer 650, respectively.

FIG. 7B shows breakage 660 and the resulting dynamic reconfiguration of the left-hand net (broker B1 625, broker B2 620, broker B3 610, and broker B4 615) and the right-hand net (broker B5 630, broker B6 635, and broker B7 640).

Figure 8:
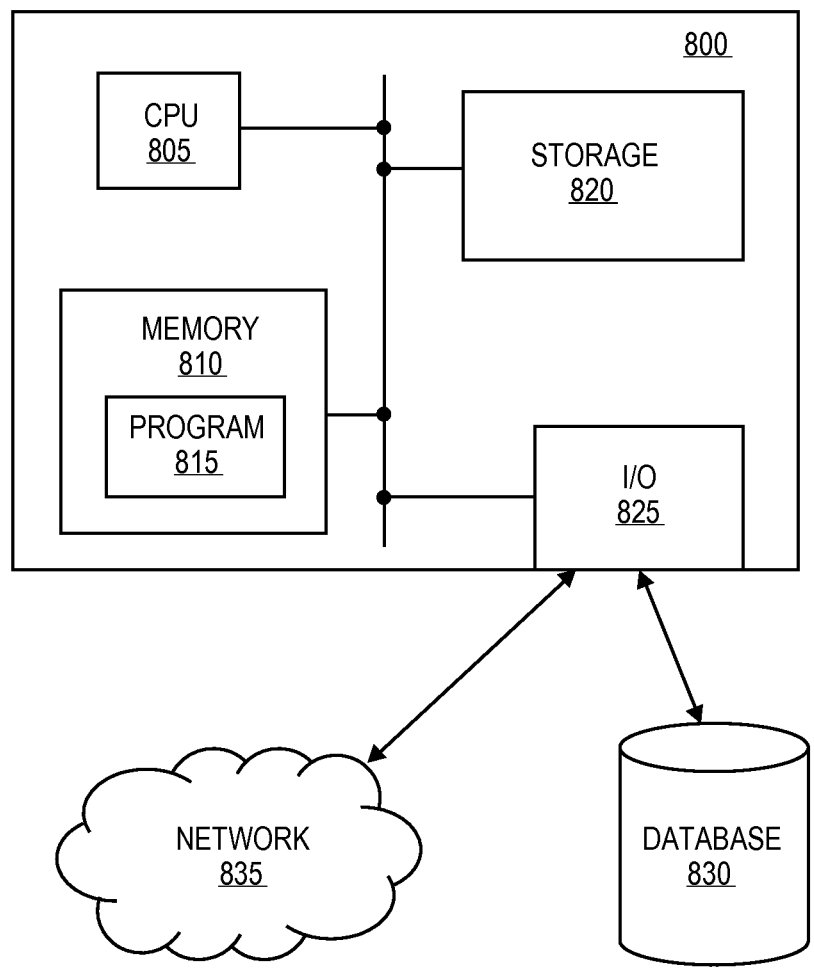
FIG. 8 is a block diagram of an exemplary data processing system that may be used to implement embodiments consistent with the invention.

FIG. 8 is a block diagram of an exemplary computing system or data processing system 800 that may be used to implement embodiments consistent with the invention, such as for example, embodiments of brokers, dynamic routing managers, consumers and/or producers. The exact components and arrangement, however, are not critical to the invention. Computing system 800 includes a number of components, such as a central processing unit (CPU) 805, a memory 810, an input/output (I/O) device(s) 825, and a nonvolatile storage device 820. System 800 can be implemented in various ways. For example, an implementation as an integrated platform (such as a workstation, personal computer, laptop, etc.) may comprise CPU 805, memory 810, nonvolatile storage 820, and I/O devices 825. In such a configuration, components 805, 810, 820, and 825 may connect and communicate through a local data bus and may access a database 880 (implemented, for example, as a separate database system) via an external I/O connection. I/O component(s) 825 may connect to external devices through a direct communication link (e.g., a hardwired or local wifi connection), through a network, such as a local area network (LAN) or a wide area network (WAN) and/or through other suitable connections. System 800 may be standalone or it may be a subsystem of a larger system.

CPU 805 may be one or more known processors or processing devices, such as a microprocessor from the Core™ 2 family manufactured by Intel™ Corporation or the Athlon™ family manufactured by AMD™ corporation. Memory 810 may be one or more fast storage devices configured to store instructions and information used by CPU 805 to perform certain functions and processes related to embodiments of the present invention. Storage 820 may be a volatile or non-volatile, magnetic, semiconductor, tape, optical, or other type of storage device or computer-readable medium, including devices meant for long-term storage.

In the illustrated embodiment, memory 810 contains one or more programs or subprograms 815 loaded from storage 820 that, when executed by CPU 805, perform various procedures, processes, or methods consistent with the present invention. Alternatively, CPU 805 may execute one or more programs located remotely from system 800. For example, system 800 may access one or more remote programs via a network 835 that, when executed, perform functions and processes related to or implementing embodiments of the present invention.

In one embodiment, memory 810 may include a computer program 815 that implements process 200 or a computer program 815 that implements process 300. Memory 810 may also include other programs or applications that implement other methods and processes that provide ancillary functionality for a broker, consumer, or producer.

Methods and systems consistent with the invention are not limited to programs or computers configured to perform dedicated tasks. For example, memory 810 may be configured with a program 815 that performs several functions when executed by CPU 805. For example, memory 810 may include a single program 815 that implements both processes 200 and 300 and the functionality of a dynamic routing manager.

Memory 810 may be also be configured with other programs (not shown) unrelated to the invention and/or an operating system (not shown) that performs several functions well known in the art when executed by CPU 805. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to the invention.

I/O device(s) 825 may comprise one or more input/output devices that allow data to be received and/or transmitted by system 800. For example, I/O device 825 may include one or more input devices, such as a keyboard, touch screen, mouse, and the like, that enable data to be input from a user, such as a system operator. Further, I/O device 825 may include one or more output devices, such as a display screen, CRT monitor, LCD monitor, plasma display, printer, speaker devices, and the like, that enable data to be output or presented to a user. I/O device 825 may also include one or more digital and/or analog communication input/output devices that allow computing system 800 to communicate, preferably digitally, with other machines, computing systems and devices. The configuration and number of input and/or output devices incorporated in I/O device 825 are not critical to the invention.

In the embodiment shown, system 800 is connected to a network 835 (e.g., the Internet or a private network), which may in turn be connected to various systems and computing machines (not shown), such as computers that are brokers, consumers, or producers. In general, system 800 may input data from external machines and devices and output data to external machines and devices via network 835.

In the exemplary embodiment shown in FIG. 8, database 830 is a standalone database external to system 800. In other embodiments, database 830 may be hosted by system 800. In various embodiments, database 830 may manage and store data used to implement systems and methods consistent with the invention. For example, database 830 may manage and store data structures that contain subscription information, routing information, link information, connection information, and the like.

Database 830 may comprise one or more databases that store information and are accessed and/or managed through system 800. By way of example, database 830 may be an Oracle™ database, a Sybase™ database, or other relational database. Systems and methods consistent with the invention, however, are not limited to separate data structures or databases, or even to the use of a database or data structure.

The foregoing description is illustrative, and variations in configuration, implementation, and embodiment of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method comprising:
receiving, by a computing device, information identifying a type of message that a message consumer is to receive;
updating routing information of the computing device in view of the information identifying a type of message that a message consumer is to receive when the computing device is communicably coupled to a device of the message consumer at a first time, wherein the routing information is updated to forward a message for the message consumer to a network entity; and
transmitting the information identifying a type of message that a message consumer is to receive from the computing device to a second computing device when the second computing device is communicably coupled to the computing device and the device of the message consumer at the first time;
wherein the second computing device updates routing information of the second computing device to forward the message for the message consumer to the computing device.

2. The method of claim 1, further comprising:
determining whether the second computing device is linked to the computing device; and
performing the transmitting only if the second computing device is linked.

3. The method of claim 1, wherein the information identifying a type of message that a message consumer is to receive comprises a set of matching criteria corresponding to information associated with the message.

4. The method of claim 1, wherein the second computing device transmits the information identifying a type of message that a message consumer is to receive to a third computing device that is communicably coupled to the second computing device; and
wherein the third computing device updates routing information of the third computing device to forward message for the message consumer to the second computing device.

5. The method of claim 1, wherein updating routing information further comprises:
creating a new channel between the computing device and the network entity.

6. The method of claim 1, wherein updating routing information further comprises:
modifying an existing channel between the computing device and the network entity.

7. A system comprising:
a memory; and
a processor, communicably coupled to the memory to receive instructions, and in response to the instructions, the processor to:
receive information identifying a type of message that a message consumer is to receive;
update routing information of a computing device in view of the information identifying a type of message that a message consumer is to receive when the computing device is communicably coupled to a device of the message consumer at a first time, wherein the routing information is updated to forward a message for the message consumer to a network entity; and
transmit the information identifying a type of message that a message consumer is to receive from the computing device to a second computing device when the second computing device is communicably coupled to the computing device and the device of the message consumer at the first time; wherein the second computing device updates routing information of the second computing device to forward the message for the message consumer to the computing device.

8. The system of claim 7, the processor to:
determine whether the second computing device is linked to the computing device; and
perform the transmit only if the second computing device is linked.

9. The system of claim 8, wherein the information identifying a type of message that a message consumer is to receive comprises a set of matching criteria corresponding to information associated with the message.

10. The system of claim 7, wherein the second computing device transmits the information identifying a type of message that a message consumer is to receive to a third computing device that is communicably coupled to the second computing device; and
wherein the third computing device updates routing information of the third computing device to forward message for the message consumer to the second computing device.

11. The system of claim 7, wherein update routing information further comprises:
create a new channel between the broker computer and the network entity.

12. The system of claim 7, wherein update routing information further comprises:
modify an existing channel between the broker computer and the network entity.

13. A non-transitory computer-readable medium instructions that, when executed by a processor, will cause the processor to perform operations comprising:
receiving, by the processor of a computing device, information identifying a type of message that a message consumer is to receive;
updating routing information of the computing device in view of the information identifying a type of message that a message consumer is to receive when the computing device is communicably coupled to a device of the message consumer at a first time, wherein the routing information is updated to forward a message for the message consumer to a network entity; and
transmitting the information identifying a type of message that a message consumer is to receive from the computing device to a second computing device when the second computing device is communicably coupled to the computing device and the device of the message consumer at the first time;
wherein the second computing device updates routing information of the second computing device to forward the message for the message consumer to the computing device.

14. The non-transitory computer-readable medium of claim 13, the operations further comprising:
determining whether the second computing device is linked to the computing device; and
performing the transmitting only if the second computing device is linked.

15. The non-transitory computer-readable medium of claim 13, wherein the second computing device transmits the information identifying a type of message that a message consumer is to receive to a third computing device that is communicably coupled to the second computing device; and
wherein the third computing device updates routing information of the third computing device to forward message for the message consumer to the second computing device.

16. The non-transitory computer-readable medium of claim 13, wherein updating routing information further comprises:
creating a new channel between the computing device and the network entity.

17. The non-transitory computer-readable medium of claim 13, wherein updating routing information further comprises:
modifying an existing channel between the computing device and the network entity.

18. The method of claim 3 further comprising routing the message to a queue in view of the information associated with the message matching with the message criteria in the information identifying a type of message that a message consumer is to receive.

19. The system of claim 9, the processor to route the message to a queue in view of the information associated with the message matching with the message criteria in the information identifying a type of message that a message consumer is to receive.

20. The non-transitory computer-readable medium of claim 13, the operations further comprising:
routing the message to a queue in view of an information associated with the message matching with a message criteria in the information identifying a type of message that a message consumer is to receive.

* * * * *